R. RAINES.
FAUCET.
APPLICATION FILED OCT. 2, 1916.

1,319,112.

Patented Oct. 21, 1919.

Inventor
Richard Raines.
By his Attorney
W. T. Criswell.

UNITED STATES PATENT OFFICE.

RICHARD RAINES, OF NEW YORK, N. Y.

FAUCET.

1,319,112.          Specification of Letters Patent.          Patented Oct. 21, 1919.

Application filed October 2, 1916. Serial No. 123,384.

*To all whom it may concern:*

Be it known that I, RICHARD RAINES, a citizen of the United States, and a resident of New York, borough of Bronx, county of Bronx, and State of New York, have invented a certain new and useful Improvement in Faucets, of which the following is a full, clear, and exact specification.

This invention relates more particularly to a class of devices adapted to be used for dispensing water.

My invention has for its object primarily to provide a device or faucet designed to be employed in conjunction with the water-supply system of a building and elsewhere whereby the water when dispensed will be clarified by being filtered, and which is formed so that all sediment and foreign substances may be easily removed from the faucet when accumulated therein as well as permitting interchangeable use of a filtering element. The invention consists essentially of a casing having a chamber with a communicating valve-controlled outlet, and having an inlet also communicating with the chamber. In the casing is a separate entrance leading into the chamber, and removably cushioned in the chamber over the outlet is a filtering element for separating all sediment and solid foreign substances from the water delivered through the faucet.

Another object of the invention is to provide in the chamber of the casing a removable spring actuated element for yieldingly retaining the filtering element on the casing over the outlet, and which may be of magnetized metal for serving to extract free iron when contained in the water.

A further object of the invention is to provide a faucet of simple and efficient construction adapted to be made in various sizes and shapes.

A practical embodiment of the invention is represented in the accompanying drawing forming a part of this specification in which similar characters of reference indicate corresponding parts in all the views, the said invention being more fully described hereinafter, and then pointed out in the claim at the end of the description.

In the drawing, Figure 1 is a longitudinal vertical section, partly in detail, taken through one form of faucet embodying my invention.

Figure 1:
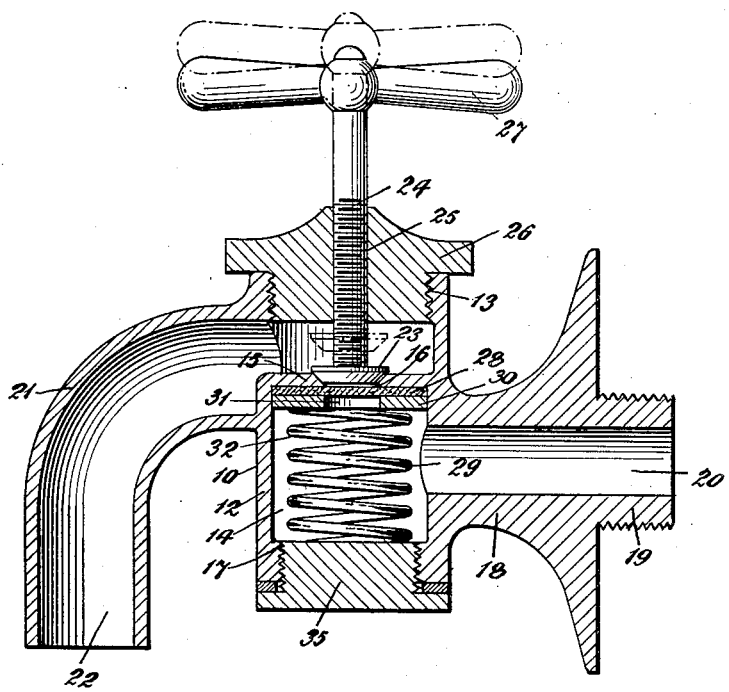
Figure 2:
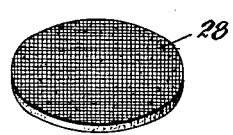
Fig. 2 is a perspective view of the filtering element used in the faucet.
Figure 3:
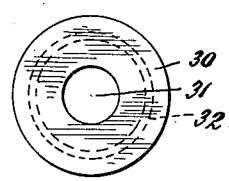
Fig. 3 is a top plan of the spring actuated element employed in the faucet.

The device, or faucet has a casing 10 which may be of any desired shape and size, though the casing has preferably a cylindrical side wall 12 with an open upper end which is interiorly threaded, as at 13, and in the lower part of the casing is a chamber 14 provided by arranging centrally of the casing a transverse partition 15. Through the partition 15 is an opening 16, forming communication between the chamber 14 and the upper part of the interior of the casing, while the lower end of the casing is open to provide an entrance, as 17, leading into the chamber 14, and the wall of this entrance is interiorly threaded, as shown. Projecting from the side wall 12 of the casing is a flange, as 18, with an exteriorly threaded extension 19 to allow the faucet to be fastened to a pipe or the like leading from a source of water supply, and through this extension as well as through the flange and also through the side wall of the casing is a passage leading into the chamber 14 to serve as an inlet 20 for the admission of water into the chamber 14. Projecting from the upper part of the casing opposite to the inlet 20 is a tubular member, or nipple, as 21, the passage through which leads through an opening in the casing into the upper part of the casing to serve as an outlet 22.

The upper portion of the partition 15 at the opening 16 may be beveled to serve as a valve-seat for reception of a valve, as 23, to open and close the passage through the opening. The valve 23 is provided on the lower end of a threaded stem, or rod 24 which passes through the upper part of the casing, and this stem is screwed through the threaded opening 25 of a nut, or cap, as 26, which is threaded in the open upper end of the casing 10. The stem 24 of the valve is of a length to extend some distance above the cap, and on the upper end of the stem is a handle 27 to allow the stem to be rotatably adjusted for seating and unseating the valve in the opening 16 of the partition 15 of the casing for opening and closing the passage through this opening to admit and shut off the flow of water through the faucet.

Serving to cause the water to be clarified of all sediment and foreign substances, removably arranged on the underside of the partition 15 of the casing is a filtering element 28 in the form of a disk of felt, or cloth, or any other intersticed material which will permit water to flow therethrough but will prevent the passage of solid matter, such as dirt, particles of gravel and the like, and this filtering element is of a diameter to fit snugly in the chamber 14 so as to cover the opening 16 of the partition 15. The filtering element 28 is yieldingly held against accidental movement on the partition 15 by a cushion, or spring, as 29, and this spring has on its top a plate 30 adapted to be freely moved in the chamber 14 of the casing 10, and through the center of this plate is an opening 31 in register with the opening 16 of the partition 15. The lower end of the spring 29 rests on a nut, as 35, which is screwed in the threaded entrance 17 of the chamber 14, the spring being tensioned so as to normally force the filtering element 28 yieldingly against the partition 15 of the casing.

To operate the faucet when applied to the delivery pipe of a water-supply system for dispensing water the handle 27 of the valve 23 is rotated to raise the valve from the seat, or opening 16 of the partition 15 of the casing. Water will then flow through the inlet 20 into the chamber 14, through the opening 31 of the plate 30, through the filtering element 28, through the valve-seat, or opening 16 of the partition 15, and through the outlet 22 to be delivered for use. If desired the spring 32 may be of magnetized metal so as to attract for collection thereon particles of free metallic iron which may be contained in the water, and in order to permit the chamber 14 to be cleared of all accumulated solid matter, by unscrewing the nut 35, this nut together with the spring 32 and the plate 31 may be removed from the chamber 14 to allow the chamber and these parts of the cushion 29 to be cleaned as well as allowing the filtering element 28 to be replaced by a new one.

In the foregoing description, I have embodied the preferred form of my invention, but I do not wish to be understood as limiting myself thereto, as I am aware that modifications may be made therein, without departing from the principle, or sacrificing any of the advantages of this invention, therefore I reserve to myself the right to make such changes as fairly fall within the scope thereof.

Having thus described my invention, I claim as new and desire to secure by Letters Patent:—

In a faucet, the combination with a chamber having a water-supply inlet as well as having a manually operable valve-controlled outlet, filtering means in the chamber over the outlet, and a magnetized metallic spring in the chamber, yieldingly holding said filtering means in contact with the outlet of the chamber whereby free metallic iron in the water admitted into the chamber may be extracted by the spring.

This specification signed and witnessed this 29th day of September, A. D. 1916.

RICHARD RAINES.

Witnesses:
C. M. CLARK,
C. SHIEGLEY.

Copies of this patent may be obtained for five cents each, by addressing the "Commissioner of Patents, Washington, D. C."